(12) United States Patent
Gibbs et al.

(10) Patent No.: US 11,307,580 B2
(45) Date of Patent: Apr. 19, 2022

(54) AUTONOMOUS VEHICLE PARKING SYSTEM

(71) Applicant: Meter Feeder, Inc., Pittsburgh, PA (US)

(72) Inventors: James Gibbs, Pittsburgh, PA (US); Daniel W. Lopretto, Pittsburgh, PA (US)

(73) Assignee: Meter Feeder, Inc., Pittsburgh, PA (US)

( * ) Notice: Subject to any disclaimer, the term of this patent is extended or adjusted under 35 U.S.C. 154(b) by 893 days.

(21) Appl. No.: 15/982,363

(22) Filed: May 17, 2018

(65) Prior Publication Data

US 2018/0335777 A1 Nov. 22, 2018

Related U.S. Application Data

(60) Provisional application No. 62/507,940, filed on May 18, 2017.

(51) Int. Cl.
*G05D 1/00* (2006.01)
*B60W 30/06* (2006.01)
(Continued)

(52) U.S. Cl.
CPC .......... *G05D 1/0088* (2013.01); *B60W 30/06* (2013.01); *B62D 15/0285* (2013.01); *G05D 1/0225* (2013.01); *G05D 1/0248* (2013.01); *G05D 1/0278* (2013.01); *G05D 1/0297* (2013.01); *G07B 15/02* (2013.01); *G05D 2201/0212* (2013.01); *G08G 1/146* (2013.01); *G08G 1/147* (2013.01)

(58) Field of Classification Search
None
See application file for complete search history.

(56) References Cited

U.S. PATENT DOCUMENTS

| 5,170,352 A | 12/1992 | McTamaney et al. |
| 5,229,941 A | 7/1993 | Hattori |

(Continued)

OTHER PUBLICATIONS

Tamrazian, A. et al., "Where is my parking spot? On-line and off-line prediction of time-varying parking occupancy", 2015.
(Continued)

*Primary Examiner* — David P. Merlino
(74) *Attorney, Agent, or Firm* — Frost Brown Todd LLC

(57) ABSTRACT

An autonomous vehicle parking system includes a parking system server that is in electronic communication with an autonomous vehicle. The server executes programming instructions that cause it to receive a parking location request from the autonomous vehicle, identify one or more parking zones that are proximate to the autonomous vehicle, determine an estimated density and a distance from a present location of the autonomous vehicle for each the parking zones, use the estimated densities and the distances to select one of the parking zones as a destination zone, and provide the autonomous vehicle with a geographic identifier for the destination zone. After the vehicle identifies an available parking space in the destination zone, the system will initiate a transaction with a parking service provider to authorize the autonomous vehicle to park in the destination zone for a period of time.

17 Claims, 3 Drawing Sheets

(51) Int. Cl.
  *G05D 1/02* (2020.01)
  *G07B 15/02* (2011.01)
  *B62D 15/02* (2006.01)
  *G08G 1/14* (2006.01)

(56) References Cited

U.S. PATENT DOCUMENTS

| | | |
|---|---|---|
| 6,151,539 A | 11/2000 | Bergholz et al. |
| 7,711,150 B2 | 5/2010 | Simon |
| 8,447,112 B2 | 5/2013 | Paul et al. |
| 9,075,415 B2 | 7/2015 | Kugelmass |
| 9,283,960 B1 | 3/2016 | Lavoie |
| 9,449,512 B2 | 9/2016 | Zafiroglu et al. |
| 9,494,439 B1 | 11/2016 | Ross et al. |
| 9,495,869 B2 | 11/2016 | Bhogal et al. |
| 9,508,260 B2 | 11/2016 | Shaik |
| 9,557,736 B1 | 1/2017 | Silver et al. |
| 9,567,007 B2 | 2/2017 | Cudak et al. |
| 2008/0291054 A1* | 11/2008 | Groft ................ G08G 1/14 340/932.2 |
| 2014/0052374 A1* | 2/2014 | Hoch ................ A61B 5/18 701/533 |
| 2014/0310075 A1* | 10/2014 | Ricci ................ A61B 5/4809 705/13 |
| 2015/0161890 A1* | 6/2015 | Huntzicker ........ G08G 1/147 340/932.2 |
| 2016/0196747 A1* | 7/2016 | Tsyrklevich ...... G08G 1/143 701/532 |
| 2018/0053237 A1* | 2/2018 | Hayes ............ G08G 1/0141 |
| 2019/0137290 A1* | 5/2019 | Levy ............. G01C 21/3461 |
| 2019/0156673 A1* | 5/2019 | Hohenacker ...... G07B 15/02 |
| 2020/0257909 A1* | 8/2020 | Korman ........... G08G 1/143 |

OTHER PUBLICATIONS

Information about Related Patents and Patent Applications, see section 6 of the accompanying Information Disclosure Statement Letter, which concerns Related Patents and Patent Applications.

* cited by examiner

AUTONOMOUS VEHICLE PARKING SYSTEM

RELATED APPLICATIONS AND CLAIM OF PRIORITY

This patent document claims priority to U.S. Provisional Patent Application No. 62/507,940, filed May 18, 2017. The disclosure of the priority application is fully incorporated into this application by reference.

BACKGROUND

The use of autonomous vehicles is increasing. In many areas, autonomous vehicles serve as part of the public transportation system, sometimes on designated paths and in other times on public streets that are shared with manually-driven vehicles.

When autonomous vehicles are used for public transportation such as on-demand car services, as well as in delivery service applications, there will inevitably be period of time in which the autonomous vehicle must remain idle. This may occur when a vehicle has dropped a passenger or cargo off at a destination but has not yet received a new service request. Idle time also may occur when a vehicle is waiting for a passenger or cargo pickup at a designated location, or when the vehicle has completed a first service call but has a period of time available before it must pick up its next passenger or cargo.

An autonomous vehicle could continue moving during an idle time if needed. However, continuous movement can waste fuel, increase emissions, contribute to traffic congestion, and require more frequent vehicle maintenance. Alternatively, an autonomous vehicle could sit and wait during idle times, but current systems require that the car move to a predetermined waiting area or be manually directed to a safe waiting spot so that the vehicle does not park in an illegal or unsafe location.

This document describes methods and systems that are designed to solve some or all of the issues described above.

SUMMARY

In various embodiments, an autonomous vehicle parking system includes a parking system server that is in electronic communication with an autonomous vehicle via a wireless communication network. The server executes programming instructions that cause it to receive a parking location request from the autonomous vehicle, identify one or more parking zones that are proximate to the autonomous vehicle, determine an estimated density and a distance from a present location of the autonomous vehicle for each the parking zones, use the estimated densities and the distances to select one of the parking zones as a destination zone, and provide the autonomous vehicle with a geographic identifier for the destination zone.

The system also may include the autonomous vehicle having a global positioning system, proximity sensors, and a transport system. The autonomous vehicle will receive the geographic identifier for the destination zone from the server. The autonomous vehicle will use the geographic identifier and data from its global positioning system move to the destination zone. Upon entering the destination zone, the vehicle will use data from its proximity sensors to identify an available parking space in the destination zone. The vehicle will then use data from the global positioning system sensor and/or proximity sensors to move into the available parking space. The vehicle will also send a parking transaction request to the server.

In response to receiving the parking transaction request, the system may initiate a transaction with a parking service provider to authorize the autonomous vehicle to park in the destination zone for a period of time.

In some embodiments, the autonomous vehicle may determine that the autonomous vehicle has at least a threshold period of idle time before the autonomous vehicle must arrive at a pickup location. If so, the vehicle may send the parking location request to the server, wherein the parking location request includes a current location as detected by a global positioning system sensor of the autonomous vehicle.

In some embodiments, the parking location request also may include a location for a starting point of a next service request. In some embodiments, the parking location request may include a current location for the autonomous vehicle and a next pickup location for the autonomous vehicle. In either of these, when identifying one or more parking zones that are proximate to the autonomous vehicle, the system may access a data set of parking zones in which each parking zone is associated with a location. The system may select, from the data set, one or more parking zones that are associated with a location that is less than a first threshold distance from the current location for the autonomous vehicle and less than a second threshold distance from the next pickup location (i.e., the starting point of the next service request). To identify one or more parking zones that are proximate to the autonomous vehicle, they system also may dynamically select the first threshold distance and the second threshold distance so that a sum of the first threshold distance and the second threshold distance is less than an overall threshold distance.

In some embodiments, when determining the estimated densities for each of the parking zones, the system may receive the estimated densities from a parking analysis system. In addition or alternatively, the system may receive real-time parking usage data from one or more parking service providers and using the real-time parking usage data to calculate the estimated densities.

In some embodiments, when selecting one of the parking zones as a destination zone, the system may select, as the destination zone, a parking zone that an estimated density that is below a threshold and for which a distance from the present location of the autonomous vehicle is below a threshold. The system also may ensure that the destination zone is a parking zone for which a distance from a next pickup location for the autonomous vehicle is below a threshold.

In various other embodiments, an autonomous vehicle parking system includes a server that is in electronic communication with an autonomous vehicle via a wireless communication network. The server includes a computer-readable medium that stores programming instructions that are configured to cause the server to receive a parking location request from the autonomous vehicle via the wireless communication network and identify one or more parking zones that are proximate to the autonomous vehicle. For each of the parking zones that are proximate to the autonomous vehicle, the server determines an estimated density for the parking zone by receiving the estimated density from a parking analysis system and/or by receiving real-time parking usage data from one or more parking service providers and using the real-time parking usage data to calculate the estimated densities. The server will use the estimated densities to select one of the parking zones as a destination zone. The server will provide the autonomous vehicle with a geographic identifier for the destination zone. After the autonomous vehicle has identified an available parking spot in the designated zone, when the server receives a parking transaction request from the autonomous vehicle, it will initiate a transaction with a parking service provider to authorize the autonomous vehicle to park in the destination zone for a period of time. Optionally, the parking location request may include includes a current location for the autonomous vehicle and a next pickup location for the autonomous vehicle. If so, then when identifying one or more parking zones that are proximate to the autonomous vehicle the server may access a data set of parking zones in which each parking zone is associated with a location. The server will select, from the data set, one or more parking zones that are associated with a location that is less than a first threshold distance from the current location for the autonomous vehicle and less than a second threshold distance from the next pickup location.

DETAILED DESCRIPTION

Figure 1:
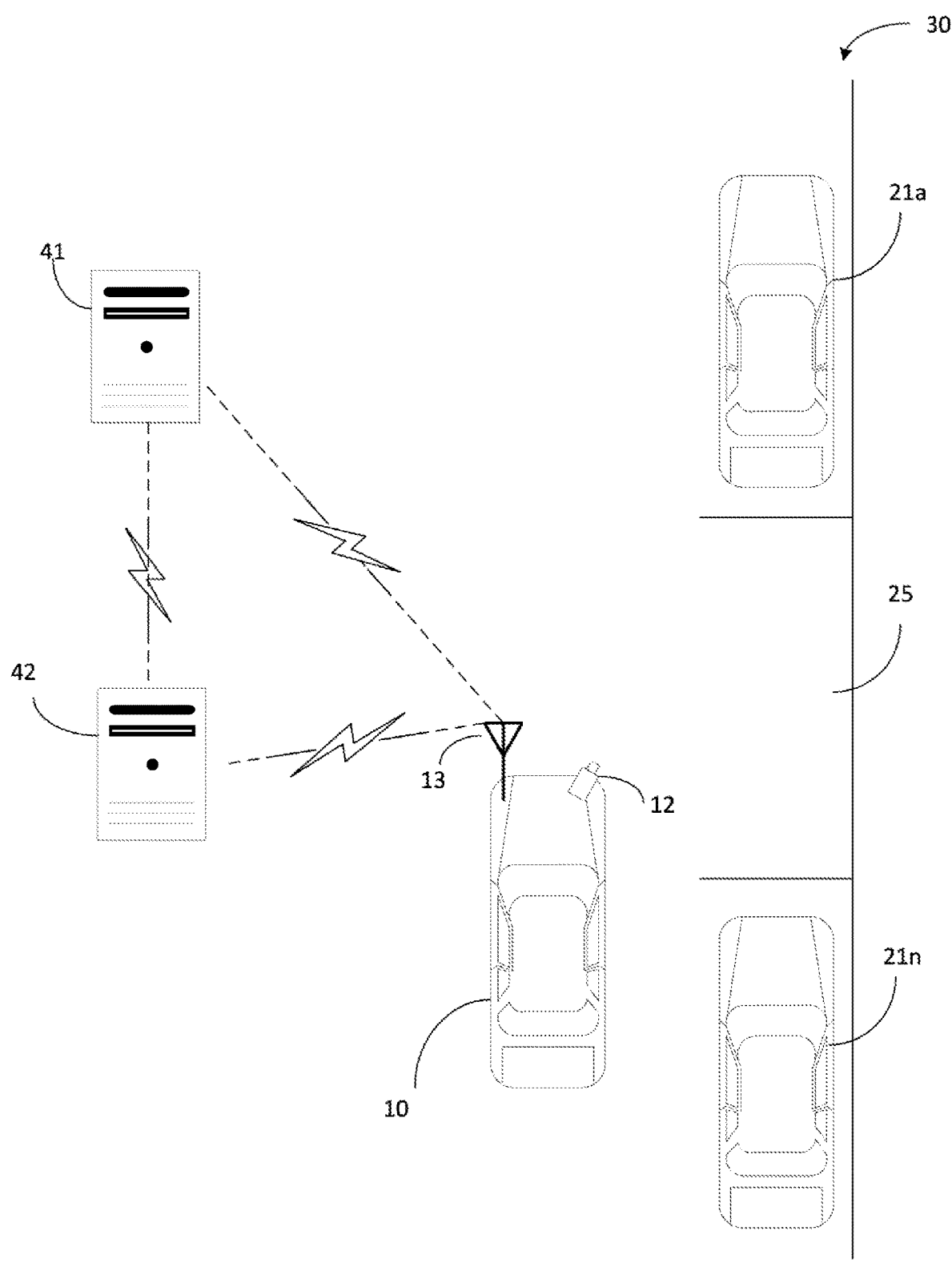
FIG. 1 illustrates various elements of an autonomous vehicle parking system.

In this document: (i) the term "comprising" means "including, but not limited to"; the singular forms "a," "an," and "the" include plural references unless the context clearly dictates otherwise; and (iii) unless defined otherwise, all technical and scientific terms used in this document have the same meanings as commonly understood by one of ordinary skill in the art.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are electronic devices, in which the server contains instructions and/or data that the client device accesses via one or more communications links in one or more communications networks. The server may be a single device or a collection of devices that are distributed but via which processing devices and/or memory are shared. In a virtual machine arrangement, a server may be an electronic device, and each virtual machine or container may also be considered to be an electronic device. In the discussion below, a client device, server device, virtual machine or container may be referred to simply as a "device" for brevity.

In this document, the terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the term "parking zone" means a physical space that is designated for vehicle parking. Vehicle operators may initiate parking purchase transactions in which they purchase authorization to park their vehicles in the parking zone for a designated period of time.

In this document, the terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

A "proximity sensor" is a sensor that is configured to detect and record or measure one or more parameters of objects in an environment that is proximate the sensor, so that a processor can use the parameters to calculate the distances between the sensor and the objects. Examples of proximity sensors include cameras and other image capture devices, light detection and ranging (LiDAR) systems, sound detection and ranging (sonar) systems, radio detection and ranging (radar) systems), and other devices that can detect an object and measure the distance between the device and the object.

A "vehicle" is a machine that is configured to transport one or more passengers and/or cargo from one location to another. Examples of vehicles include automobiles, trucks, vans, motorcycles, aircraft, watercraft, drones and the like. An "autonomous vehicle" is a land-based, airborne or water-based vehicle that includes a robotic transport system, a processor, and programming instructions that are configured to enable the processor to command the robotic transport system to move the vehicle through an environment without human steering or other direction. Semi-autonomous vehicles, such as those that provide for human override, or human operation in certain situations are included within the definition of "autonomous vehicles." The transport system may be a motor and set of wheels and/or rollers (in case of a land-based vehicle), or propellers and/or propulsion systems (in case of an unmanned aerial vehicle). Examples of autonomous vehicles are disclosed U.S. Pat. Nos. 6,151,539; 5,170,352; 5,229,941; and 9,075,415, the disclosures of which are fully incorporated into this document by reference.

When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

FIG. 1 illustrates an example of a vehicle parking system in which an autonomous vehicle 10 moves throughout an area. The autonomous vehicle 10 includes a transport system (such as wheels, an engine or motor, and a drivetrain), a processor, one or more proximity sensors 12, a transceiver 13, a global positioning system (GPS) sensor, and programming instructions stored on a computer-readable medium. The autonomous vehicle 10 may be an automobile as shown, or it may be any mobile vehicle such as a truck, cart, scooter, unmanned aerial vehicle (UAV) or other mobile robotic device. The transport system will be a motor and set of wheels and/or rollers (in case of a land-based vehicle), or propellers and/or propulsion systems (in case of a UAV or water-based vehicle).

As the autonomous vehicle 10 moves throughout an environment, it may encounter one or more parking zones. Any number of vehicles 21a . . . 21n will be parked in each parking zone. A parking zone also may include one or more available parking spaces 25 in which the autonomous vehicle may park. An autonomous vehicle may use its proximity sensors to detect and move into an available parking space using any now or hereafter known autonomous vehicle movement process. Examples of such processes are disclosed in U.S. Pat. Nos. 9,449,512; 9,494,439; and 9,283,960, the disclosures of which are fully incorporated into this document by reference.

The autonomous vehicle will include a computer-readable medium with programming instructions that, when executed by a processor of the autonomous vehicle 10, are configured to cause the autonomous vehicle's transport system to move the autonomous vehicle along a route that includes one or more parking zones 30.

The system will include one or more servers 41, 42 that are in communication with the autonomous vehicle 10 via a transceiver 13 and a wireless communication network. At least one of the servers 41 will be part of an autonomous vehicle parking system and will include instructions to receive and process parking location requests and parking transaction requests as discussed below. The parking system server 41 and/or the autonomous vehicle 10 also may communicate with a parking service provider server 42 that may receive parking transaction request and authorize vehicles to park in various zones for one or more periods of time.

Figure 2:
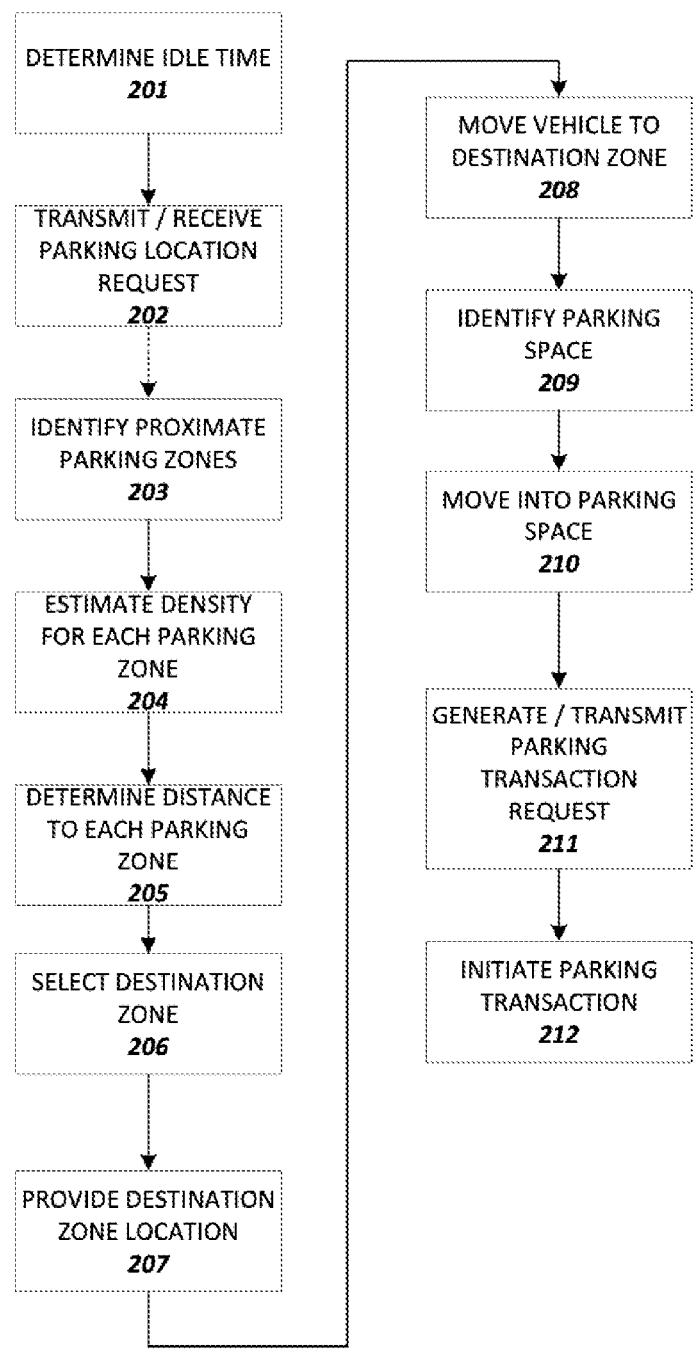
FIG. 2 is a flowchart illustrating various steps that a parking enforcement system may implement.

FIG. 2 illustrates a process by which an autonomous vehicle parking system may operate. A parking system server communicates with an autonomous vehicle via a wireless communication network. The autonomous vehicle moves about an area, completing service requests that involve picking up passengers and/or cargo at starting points and dropping off the passengers and/or cargo at destination points. Before or after the autonomous vehicle completes a service request, the vehicle's processor or an electronic device that is in communication with the vehicle's processor may calculate a period of idle time (step 201). Idle time may be calculated in any of several ways. For example, the system may query a mapping service for an expected period of time required to travel from the drop-off point of the first service request to the starting point of the next service request. If the period of time required to travel yields an arrival time that is more than a threshold period of time before a scheduled starting time for the second service request, then the period of time between the expected arrival time and the scheduled arrival time may be considered to be idle time. If the vehicle does not yet have a scheduled service request that is scheduled after the passenger or cargo drop-off, the system may determine that the vehicle will have an indefinite or default period of idle time.

If the determined period of idle time exceeds a threshold value, the autonomous vehicle or connected electronic device may generate and transmit a parking location request (step 202), and a parking system server will receive the request. The parking location request may include data such as an identifier for the autonomous vehicle, a current location of the autonomous vehicle (as detected by the vehicle's GPS system), the determined idle period, the location and scheduled starting time for the next service request (or, if no next service request is scheduled, an indication of that fact), and/or other data.

The parking system server will use the data from the parking location request and/or other data to identify one or more parking zones that are proximate to the autonomous vehicle (step 203) and which are thus candidate locations for the vehicle to park. The system may do this in any number of ways. For example, the system may access a data set of parking zones, in which each parking zone is associated with a location. The system may select, from the data set, one or more parking zones that are associated with a location that is less than a first threshold distance from the current location for the autonomous vehicle and less than a second threshold distance from the next pickup location (i.e., the starting point of the next service request). Each of the distances may be a physical distance (e.g., miles, kilometers, and the like) or a temporal distance (i.e., estimated travel time). Optionally, the system may dynamically select the first threshold distance and the second threshold distance so that a sum of the first threshold distance and the second threshold distance is less than an overall threshold distance.

The parking system server will also determine an estimated density (step 204) and a distance from the autonomous vehicle's present location (step 205) for each of the proximate parking zones. The system may determine the distances using any suitable process, such as by querying a mapping service with the vehicle's location and the parking zone's location and receiving the estimated distance in response to the query. Each of the distances may be a physical distance (e.g., miles, kilometers, and the like) or a temporal distance (i.e., estimated travel time). The system may determine the estimated density of the vehicles that are parked in the parking zone by receiving the estimated density from an external source, or by capturing one or more images and processing the images to identify a number of vehicles that are detected in the image. The system also may also access the parking enforcement database to identify a number of real-time, active parking purchase transactions in the zone at the time and use that number as the estimated parking density (or as a factor of the parking density, such as the number of vehicles per unit area). Other methods of estimating parking density are disclosed in publications such as Tamrazian et al., "Where is My Parking Spot?", *Transportation Research Record: Journal of the Transportation Research Board*, vol. 2489 (2015).

The parking system server will use the estimated densities and the distances to select one of the parking zones as a destination zone (step 206). The system may do this by selecting a zone having an estimated density that is below a threshold, a distance from the present location of the autonomous vehicle that is below a threshold, a distance from the next service request starting point that is below a threshold, and/or other criteria. Optionally, the system may require that each of these criteria be satisfied, or it may use an algorithm that is a function using weighted values of any or all of these or other criteria. If multiple candidate parking zones satisfy the criteria, the system may select a candidate zone based on any determining factor, such as which of the candidate parking zones is closest to the current location, which parking zone is closest to the next service request's starting point, which parking zone has the lowest density, which parking zone has a lowest cost of parking, and/or other criteria or functions based on any of these criteria.

The parking system server will then provide the autonomous vehicle with a geographic identifier for the destination zone (step 207). After the autonomous vehicle receives the geographic identifier for the destination zone, it will use the geographic identifier and data from its global positioning system sensor to cause its transport system to move the autonomous vehicle to the destination zone (step 208). Upon entering the destination zone, the autonomous vehicle will use data from its proximity sensors to identify an available parking space in the destination zone (step 209). It will then use data from the global positioning system sensor and proximity sensor(s) to cause its transport system to move the autonomous vehicle into the available parking space (step 210).

After the autonomous vehicle has identified an available parking space in the destination zone and/or moved into the space, the autonomous vehicle will generate a parking transaction request and send it to either the parking system server or a parking service provider server (step 211). In response to receiving the parking transaction request, the receiving server will initiate a parking transaction with a parking service provider to authorize the autonomous vehicle to park in the designated zone for a period of time (step 212). The system may do this by presenting a payment credential that is associated with the autonomous vehicle, selecting a period of time that is equal to or greater than the idle time, and processing payment for the selected period of time via the payment credential.

Figure 3:
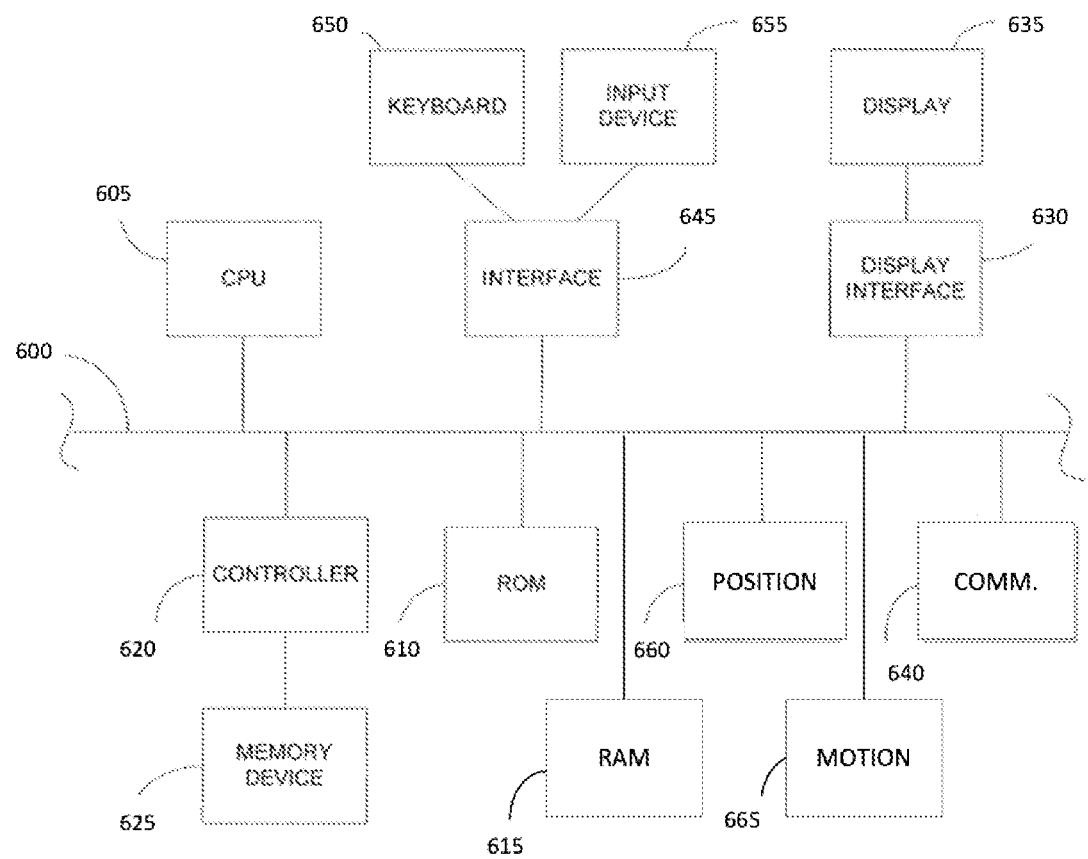
FIG. 3 illustrates example elements that may be included in an electronic device.

FIG. 3 depicts a block diagram of hardware that may be used to contain or implement program instructions, such as those of any of the cloud-based servers or autonomous vehicle described above. A bus 600 serves as an information highway interconnecting the other illustrated components of the hardware. Processor (CPU) 605 is a central processing device of the system, performing calculations and logic operations required to execute a program. CPU 605, alone or in conjunction with one or more of the other elements disclosed in FIG. 3, is an example of a processing device, computing device or processor as such terms are used within this disclosure. The processing device may be a physical processing device, a virtual device contained within another processing device, or a container included within a processing device. Read only memory (ROM) 610 and random access memory (RAM) 615 constitute examples of memory devices.

A controller 620 interfaces with one or more optional non-transitory computer-readable storage media (i.e., memory device 625) to the bus 600. These storage media may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on the storage media 625 discussed above. The programming instructions for various steps of the processes described above and in the claims may be stored in a memory of the autonomous vehicle, on a memory of one or more remote servers that are in electronic communication with the autonomous vehicle, or distributed across memory devices of the autonomous vehicle and one or more remote servers.

An optional display interface 630 may permit information from the bus 600 to be displayed on the display 635 in audio, visual, graphic or alphanumeric format. Communication with external devices, such as a printing device, may occur using various communication elements 640, such as a communication port or antenna. A communication element 640 may be communicatively connected to a communication network, such as the Internet or an intranet.

The hardware may also include an interface 645 which allows for receipt of data from input devices such as a keyboard 650 or other input device 655 such as a mouse, a touch pad, a touch screen, a remote control, a pointing device, a video input device and/or an audio input device. A positional sensor 660 and/or motion sensor 665 may be included to detect position and movement of the device. Examples of motion sensors 665 include gyroscopes or accelerometers. Examples of positional sensors 660 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A parking system, comprising:
a server having a computer-readable medium that stores programming instructions configured to cause the server to:
receive a parking location request including at least a current location and a next service request location,
determine an estimated density for each of one or more parking zones that are less than a first threshold distance from the current location and less than a second threshold distance from the next service request location,
provide a geographic identifier for a destination zone having the determined estimated density below a threshold, and
cause a transport system to move a vehicle to the destination zone.

2. The parking system of claim 1, wherein the computer-readable medium further comprises programming instructions that are configured to cause the server to identify parking zones that are proximate to a transceiver in communication with the server via a wireless network.

3. The parking system of claim 1, wherein the computer-readable medium further comprises programming instructions that are configured to cause the server to estimate a distance from a transceiver in communication with the server via a wireless network and each of the one or more parking zones proximate to the next service request location identified in the parking location request.

4. The parking system of claim 1, wherein the instructions to determine the estimated densities for each of the one or more parking zones further comprise instructions configured to cause the server to receive the estimated densities from a parking analysis system.

5. The parking system of claim 1, wherein the instructions to determine the estimated densities for each of the one or more parking zones further comprise instructions configured to cause the server to receive real-time parking usage data from one or more parking service providers and use the real-time parking usage data to calculate the estimated densities.

6. The parking system of claim 1, wherein the instructions to determine the estimated densities for each of the one or more parking zones further comprise instructions configured to cause the server to capture one or more images of the one or more parking zones and identify a number of vehicles in the one or more images.

7. The parking system of claim 1, wherein the instructions to determine the estimated densities for each of the one or more parking zones further comprise instructions configured to cause the server to access a parking enforcement database, identify a number of real-time, active parking purchase transactions in each of the one or more parking zones, and estimate parking density.

8. The parking system of claim 1, wherein the estimated density is a number of vehicles per unit area.

9. The parking system of claim 1, wherein a sum of the first threshold distance and the second threshold distance is less than an overall threshold distance.

10. A method for parking comprising:
by a server that is in electronic communication with an autonomous vehicle via a wireless communication network:
receiving a parking location request including at least a current location and a next service request location,
determining an estimated density for each of one or more parking zones that are less than a first threshold distance from the current location and less than a second threshold distance from the next service request location,
providing a geographic identifier for a destination zone having the determined estimated density below a threshold, and
cause a transport system to move a vehicle to the destination zone.

11. The method of claim 10, further comprising identifying parking zones that are proximate to a transceiver in communication with the server.

12. The method of claim 10, further comprising estimating a distance from a transceiver in communication with the server and each of the one or more parking zones proximate to the next service request location identified in the parking location request.

13. The method of claim 10, further comprising receiving the estimated densities from a parking analysis system.

14. The method of claim 10, further comprising receiving real-time parking usage data from one or more parking service providers and using the real-time parking usage data to calculate the estimated densities.

15. The method of claim 10, further comprising capturing one or more images of the one or more parking zones and identifying a number of vehicles in the one or more images.

16. The method of claim 10, further comprising accessing a parking enforcement database, identifying a number of real-time, active parking purchase transactions in each of the one or more parking zones, and estimating a parking density based on the number of real-time, active parking purchase transactions.

17. The method of claim 10, wherein the estimated density is a number of vehicles per unit area.

\* \* \* \* \*